United States Patent [19]

Redman

[11] Patent Number: 4,739,642

[45] Date of Patent: Apr. 26, 1988

[54] TUBE FORMING APPARATUS

[75] Inventor: Robert J. Redman, Indian River, Mich.

[73] Assignee: Tube Fab of Afton Corp., Afton, Mich.

[21] Appl. No.: 935,826

[22] Filed: Nov. 28, 1986

[51] Int. Cl.$^4$ : .............................................. B21D 11/04
[52] U.S. Cl. ........................................ 72/306; 72/316; 72/321; 72/370; 72/427
[58] Field of Search ................. 72/306, 317, 318, 321, 72/152, 356, 370, 427, 316; 29/157 A

[56] References Cited

U.S. PATENT DOCUMENTS

| | | | |
|---|---|---|---|
| 1,683,661 | 9/1928 | Felding | 72/306 |
| 1,951,334 | 3/1934 | Böhling | |
| 2,535,470 | 12/1950 | Welshman | |
| 2,739,376 | 3/1956 | Peet | 29/542 |
| 2,907,102 | 10/1959 | Armstrong et al. | 29/157 |
| 2,971,556 | 2/1961 | Armstrong et al. | |
| 3,000,424 | 9/1961 | Weise | |
| 3,248,920 | 5/1966 | Miller | 72/298 |
| 3,335,485 | 8/1967 | Russo | 29/157 A |
| 3,396,569 | 8/1968 | Miller | 72/369 |
| 3,698,228 | 10/1972 | Campbell | 72/306 |
| 4,220,028 | 9/1980 | Koser et al. | 72/117 |

FOREIGN PATENT DOCUMENTS 164328  4/1953  Australia ............................... 72/321

Primary Examiner—Daniel C. Crane
Attorney, Agent, or Firm—Basile and Hanlon

[57] ABSTRACT

Tube forming apparatus for forming a tubular part having an enlarged diameter end section at one end with an adjacent short radius bend is disclosed. A straight length of tubing is magnetically positioned between die members and fixedly clamped with opposite ends of the tube projecting from opposite ends of the die. One end of the clamped tube is then enlarged to form the enlarged end section. A magnetic transfer device is engage with the other end of the clamped tubing and, with the die opened, the tube is transferred to a second position between the die members which are closed to clamp the enlarged end section only with the remainder of the tubing projecting from the die. A tightly fitting plug member is seated in the interior of the clamped end section and a bending member the bends the projecting end of the tubing against an anvil formed on one of the die members.

7 Claims, 4 Drawing Sheets

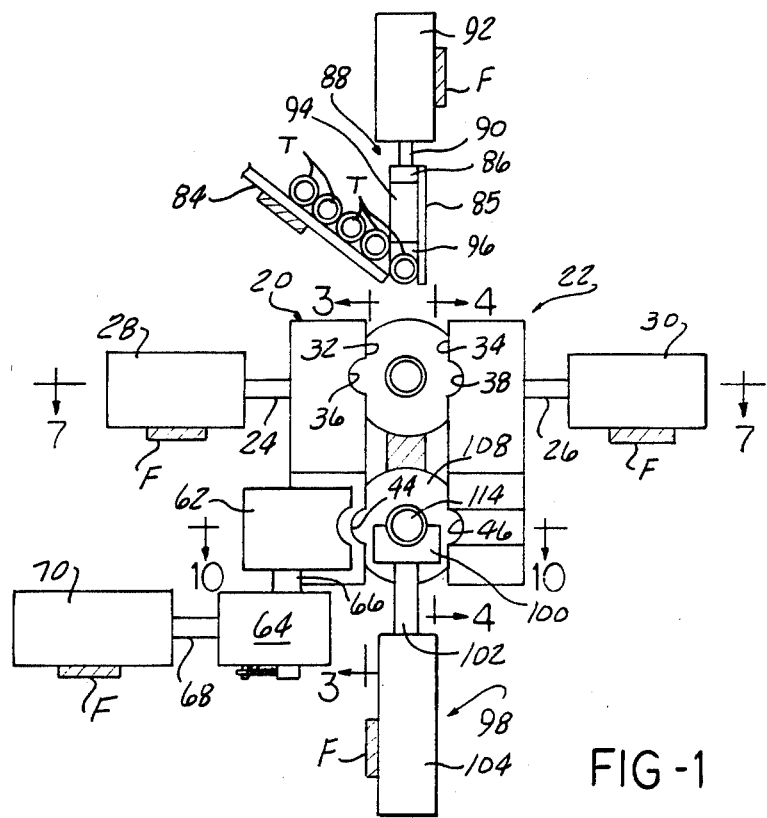
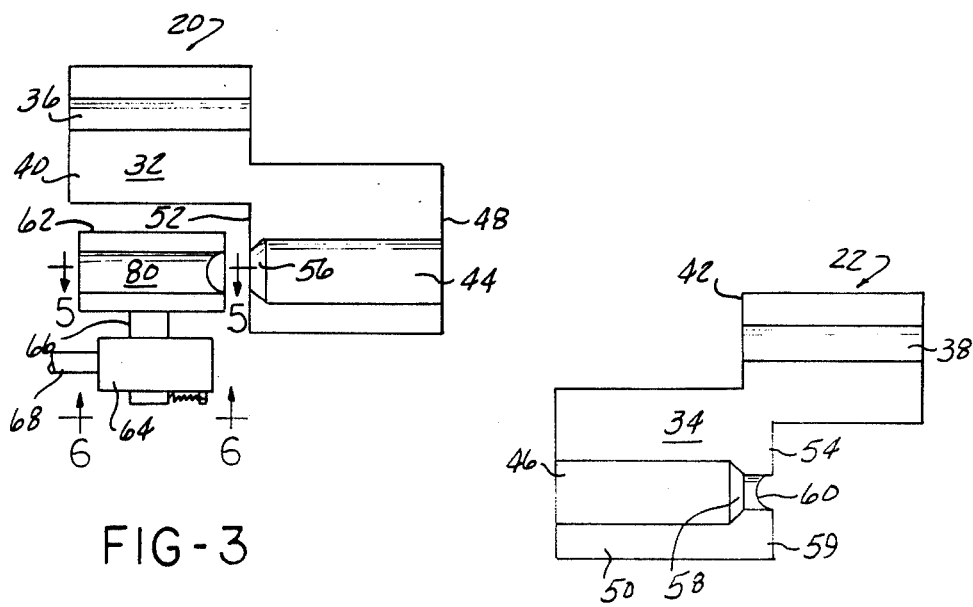

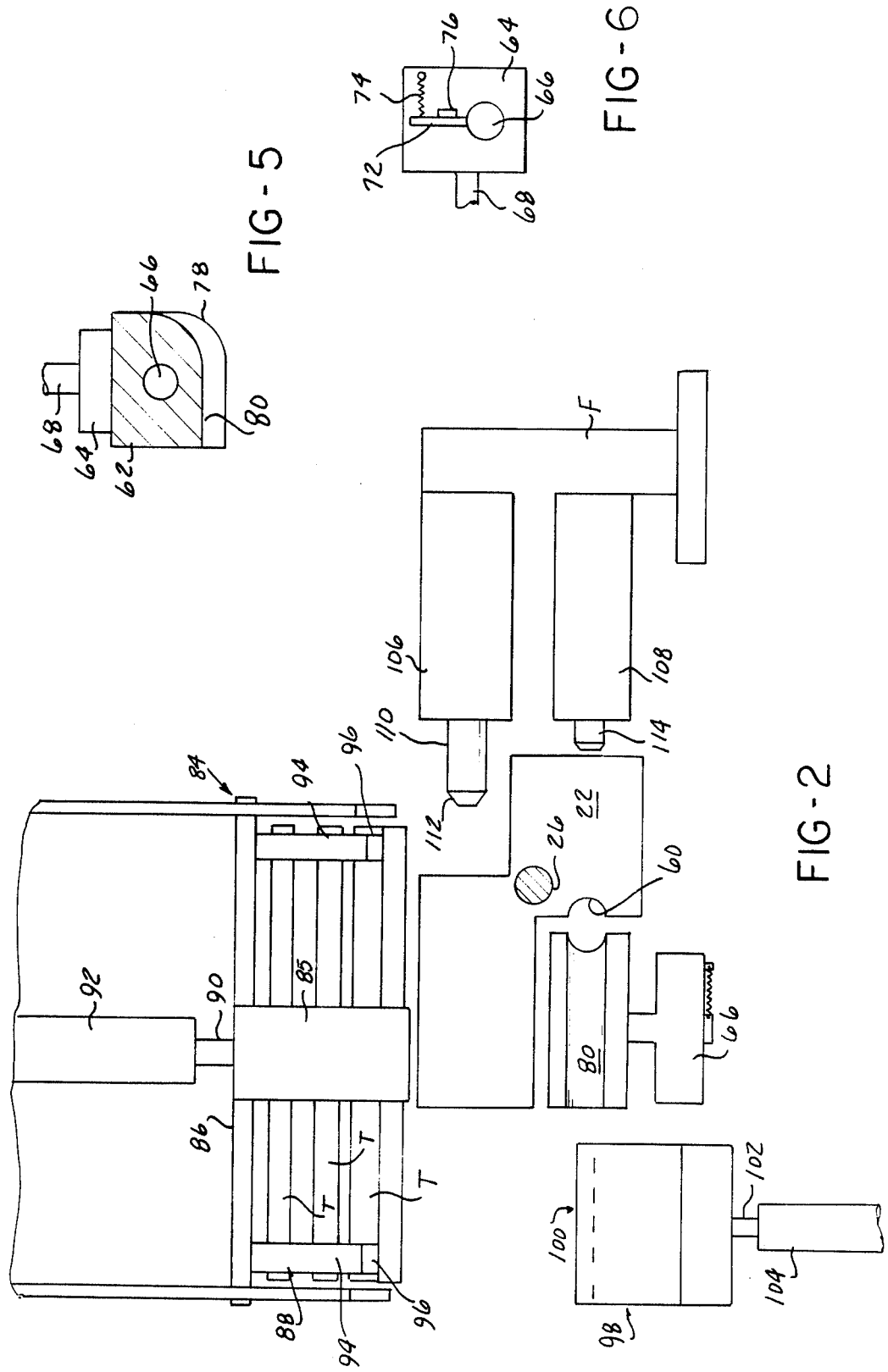

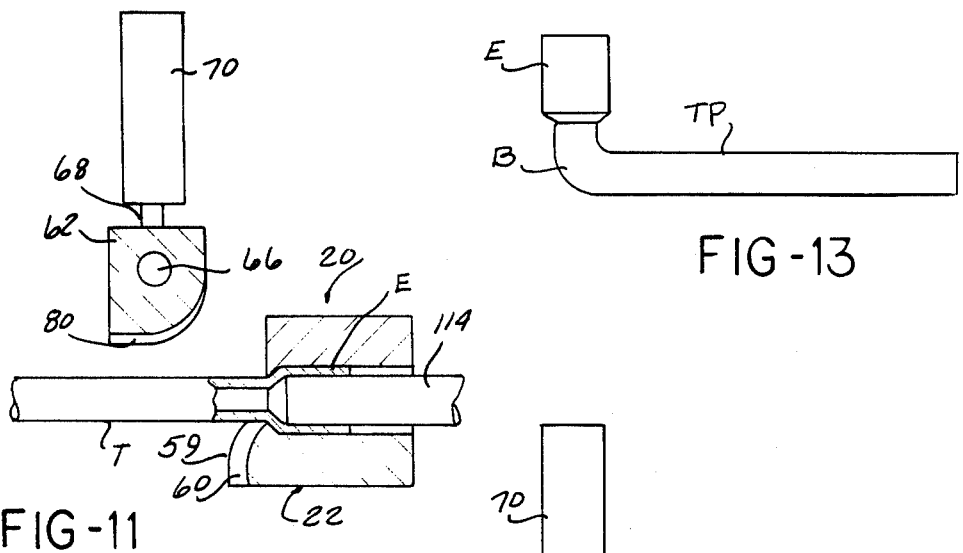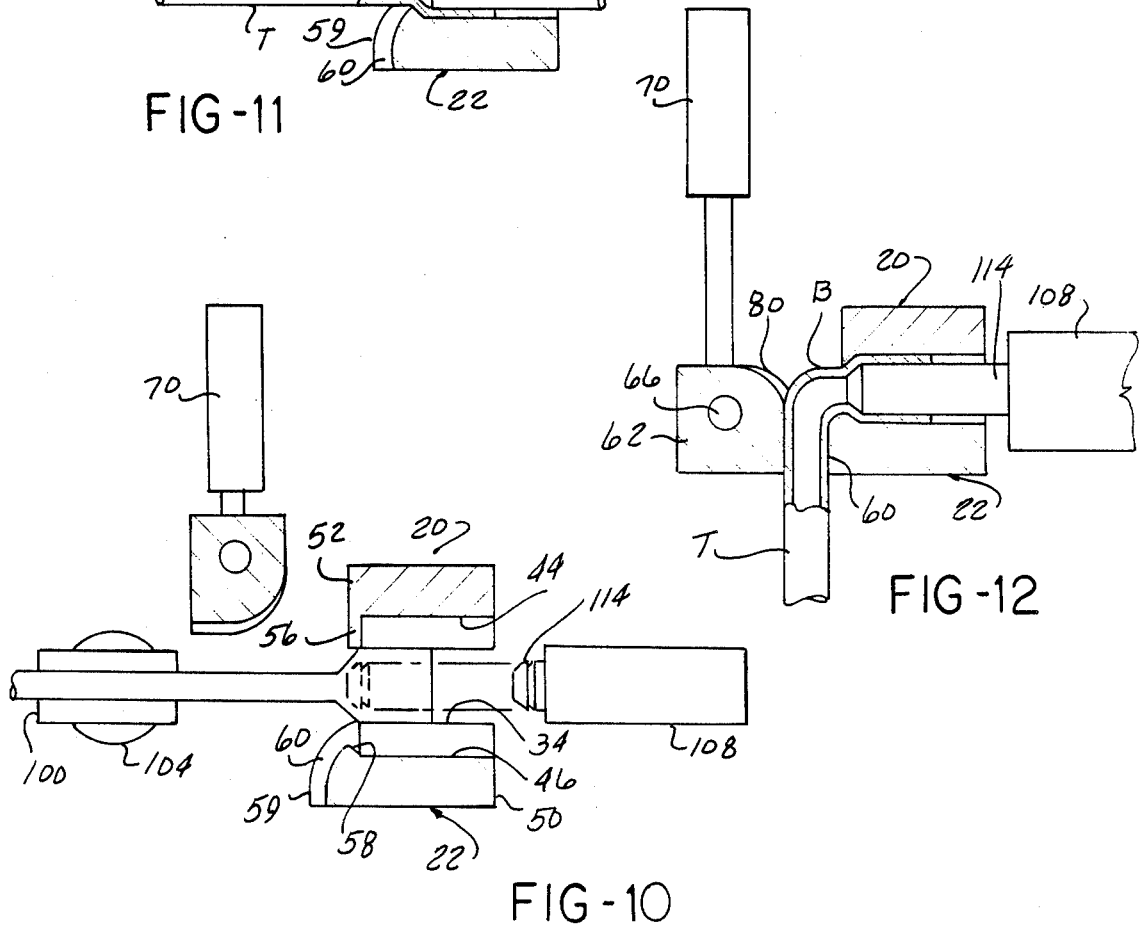

TUBE FORMING APPARATUS

BACKGROUND OF THE INVENTION

The present invention is directed to apparatus for forming tubular parts from relatively small diameter metal tubing, as for use in automotive vacuum systems, for example.

In such systems, it is quite common to connect a length of tubing to a relatively short inlet or outlet tube projecting from the housing of a circuit component by radially expanding the end of the length of tubing until it can be slipped onto and braized to the inlet or outlet fitting. Clearance problems frequently require that the length of tubing be bent close to the large diameter end section. Formation of tubular parts of this last configuration, which have an enlarged diameter section at one end and a bend, typically 90 degrees, in the tube adjacent this enlarged diameter end section, have presented a problem, particularly when such parts are to be produced on a mass production basis.

The tubing employed is typically a relatively soft maleable steel which does not present any large problem in forming the enlarged diameter section or in forming a bend in the tubing except in the case where it is desired to form the bend closely adjacent the enlarged diameter end section. The enlargement and bending are most efficiently performed in two steps, normally by bending the tube after the end has been enlarged. When the bend must be performed at a location close to the enlarged diameter section, the formation of the bend will distort the enlarged section resulting in a poor fit between the enlarged section and the tube to which it is to be fitted.

The present invention is especially directed to a tube forming apparatus which enables the formation of a relatively short radius bend immediately adjacent and in fact merging tangentially with an enlarged end section of the tubing.

SUMMARY OF THE INVENTION

In accordance with the present invention, a straight length of tubing of a uniform first diameter is clamped between a pair of opposed die members with opposite ends of the tube projecting from opposite ends of the die. An expanding member is then driven into one open end of the tubing to form that projecting portion of the tubing into the enlarged diameter end section.

The tubing is then transferred to a second set of recesses in the die member which are conformed to tightly receive the enlarged diameter end section just previously formed. This recess is adjacent one end of the die and the remaining or unenlarged portion of the tubing projects from the die. A tightly fitting plug member is then inserted fully into the interior of the enlarged diameter end section so that the wall of this section of the tubing is tightly clamped both internally and externally.

While the enlarged diameter end section is so clamped, a tube bending member is driven against the projecting portion of the tubing to bend the tubing tightly against a curved surface or anvil portion formed on one of the die members at the end of the enlarged diameter receiving recess.

Straight lengths of tubing are supplied in succession from a magazine to the first forming station in the die by a magnetic feeding device operable to magnetically grip a length of tubing in the magazine closely adjacent each of its opposite ends and to carry the tubing down between the open die members into operative alignment with the first recesses which clamp the tubing while its end section is being enlarged. The magnetic transfer device engages the straight length of tubing only on those portions which project from opposite ends of the die when the die is closed, and thus the incoming length of tubing is held by the magnetic transfer device until after the die is closed to fixedly clamp the length of tubing in position.

A second magnetic transfer device is engageable with that portion of the tubing which projects from the die station at the end opposite that at which the enlargement is formed. The second transfer device magnetically grips the tube end, and after the enlargement is formed will transfer the tube, upon opening of the die members, to a position in which the freshly formed enlarged diameter end section may be gripped by the recesses described above.

Other objects and features of the invention will become apparent by reference to the following specification and to the drawings.

IN THE DRAWINGS

FIG. 1 is a simplified, partially schematic, end view of one form of apparatus embodying the present invention;

FIG. 2 is a side elevational view of the apparatus illustrated in FIG. 1;

FIG. 3 is a side elevational view of one face of a die member of FIG. 1, taken approximately on the plane 3—3 of FIG. 1;

FIG. 4 is a side elevational view of the opposed die face, taken approximately on line 4—4 of FIG. 1;

FIG. 5 is a detailed cross-sectional view taken on line 5—5 of FIG. 3;

FIG. 6 is a bottom view of a portion of the bending apparatus taken on line on the plane 6—6 of FIG. 3;

FIG. 10 is a detailed cross-sectional view taken approximately on plane 10—10 of FIG. 1 showing the die members in their open position;

FIG. 11 is a view similar to FIG. 10 showing a subsequent stage of operation of the device;

FIG. 12 is a view similar to FIG. 11 showing a subsequent stage in the operation of the device; and FIG. 13 is a side elevational view of a tubular part formed by the apparatus of FIG. 1.

Figure 7:
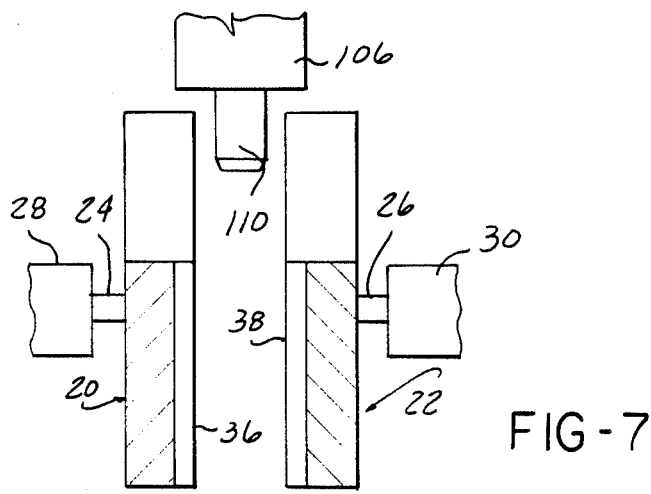
FIG. 7 is a detailed cross-sectional view taken approximately on the plane 7—7 of FIG. 1 showing the die members in their open position.

Referring first to FIGS. 1 and 2, an apparatus embodying the present invention includes a pair of opposed die members designated generally 20 and 22 respectively carried by the piston rods 24, 26 of a pair of hydraulic cylinders 28, 30. Cylinders 28 and 30 are mounted upon a fixed frame schematically illustrated at F and are employed to drive die members 20 and 22 between the die open position shown in FIG. 1 and a die closed position in which the opposed die faces 32, 34 are in face-to-face contact with each other. It will be appreciated that die members 20 and 22 are supported and guided by suitable means, not shown, upon the fixed frame of the machine.

Referring now particularly to FIGS. 1, 3 and 4, the opposed die faces 32 and 34 are formed with semi-cylindrical recesses 36, 38 which extend horizontally across the die face from front to rear in the top section 40, 42 of the respective die members. A somewhat larger diameter pair of opposed semi-cylindrical recesses 44, 46 are formed in the lower portions 48, 50 of the respective die members, the recesses 44, 46 terminating adjacent the rear end 52, 54 of each die member in an inwardly convergent conical end section 56, 58. As best seen in FIGS. 2, 3 and 4, the lower portions 48 and 50 of the respective die members are offset forwardly from the upper portions 40, 42.

As best seen in FIGS. 4 and 10, the rearward end 54 of the lower portion 50 of die member 22 projects rearwardly beyond the corresponding rearward end 52 of the lower portion of die member 20. This rearward extension is formed as an anvil 59 which, as best seen in FIG. 10, is convexly curved tangentially away from die face 34 through approximately 90 degrees, and this curved surface is formed with a semi-cylindrical recess 60 whose cross-section is of a diameter less than that of recess 46.

The recess 60 is conformed to the radial inner side of the bend B (FIG. 13) to be formed by the apparatus in a tubular part TP having an enlarged diameter end section E extending tangentially from end B.

Referring now particularly to FIGS. 1, 2, 3 and 10, a bending member 62 is mounted below the upper portion of die member 20. Bending member 62 is rotatably supported upon a support block 64 by means of a shaft 66 fixedly secured to member 62 and rotatably received in block 64. Block 64 is mounted upon the end of a piston rod 68 of a hydraulic cylinder 70 fixedly mounted on the machine frame F (FIG. 1). As best seen in FIGS. 1 and 6, shaft 66 projects below the bottom of blocks 64 and a radially projecting arm 72 fixedly secured to the projecting end of shaft 66 is resiliently biased by a tension spring 74 which urges arm 72 against a fixed stop 76 on the bottom of block 64 to rotatively bias bending member 62 to a normal rest position.

Referring now to FIG. 5, bending member 62 when viewed in plan is of generally rectangular configuration with the exception that one corner is rounded as at 78. A semi-cylindrical groove 80 extends entirely across one side of bending member 62, continues around the rounded corner 78 and gradually merges with the adjacent side as best seen in the cross-sectional view of FIG. 5. Groove 80 in cross-section is of the same diameter as recess 60 in anvil 59.

Returning now to FIGS. 1 and 2, the apparatus described above is designed to form a tubular part TP as shown in FIG. 13 from a straight length of tubing T of a uniform first diameter. Lengths of tubing T are stored (FIG. 1) in an inclined magazine designated generally 84 and are normally retained in the magazine by a resilient retainer plate 85 vertically cantilevered downwardly from the frame 86 of a tube transfer device designated generally 88. The frame 86 of the transfer device is fixedly secured to the piston rod 90 of a hydraulic cylinder 92 mounted upon frame F.

Referring now particularly to FIG. 2, frame 86 of the transfer device includes a pair of downwardly projecting legs 94 at its opposite ends, each leg 94 fixedly carrying a permanent magnet 96 at its lower end. As best seen in FIG. 1, the bottom surface of the magnets 96 is formed in a concave configuration to engage the upper side of the lowermost tube T in magazine 84.

Upon actuation of cylinder 92 to extend its piston rod 90, the transfer device frame 86 is driven downwardly from the position shown in FIG. 1, pushing the lowermost tube downwardly below the bottom end of magazine 85, retainer plate 84 flexing outwardly slightly at its lower end to enable the lowermost tube T to clear the lower lip of the magazine. The stroke of cylinder 92 is such that when its piston rod is fully extended, the tube T magnetically held by magnets 96 is accurately aligned with the recesses 36, 38 of the opened die members 20. As best seen in FIG. 2, the legs 94 of the transfer unit 88 will clear the front and rear ends of the upper section of the die members. Thus, when piston rod 90 is fully extended, it will accurately locate the tube T held by magnets 96 in alignment with recesses 36, 38, and hold the tube in this position as the die members are moved to their closed position to clamp the tube T between the die members. Cylinder 92 is then actuated to return the transfer unit to the ready position shown in FIG. 1.

As is apparent from an examination of FIG. 2, when a length of tubing T is gripped between die members 20 and 22 within recesses 36 and 38, the opposite ends of the tube will project from the respective front and rear ends of the upper section of the die member.

A second transfer device designated generally 98 (FIGS. 1 and 2) is employed to transfer a length of tubing T from the upper portion of die members 20, 22 to the lower portion when the die members are opened. Transfer device 98 includes a permanent magnet 100 fixedly mounted upon the piston rod 102 of a hydraulic cylinder 104 fixedly mounted on frame F. As best seen in FIG. 2, magnet 100 is disposed rearwardly of the die members in alignment with that portion of the tube T which will project rearwardly beyond the die members. The stroke of piston rod 102 vertically is best appreciated in FIG. 1 in which the magnet 100 is at the lower end of the stroke of piston rod 102 with the cradle configuration at an elevation such that a length of tubing T engaged within the cradle will be aligned with the recesses 44, 46 in the lower portions of the respective die members. At its upper end limit of movement, the magnet 100 would be elevated from the position shown in FIG. 1 into engagement with the rearwardly projecting end of a length of tubing T held in recesses 36, 38 of the upper portion of the die member.

Referring now to FIG. 2, the apparatus also includes a pair of hydraulic cylinders 106, 108 fixedly mounted upon the frame F and respectively coaxially aligned with recesses 36, 38 and recesses 44, 46. The piston rod 110 of the upper cylinder 106 is chamfered at its end as at 112 to constitute an expansion tool insertable within the projecting end of a length of tubing clamped in recesses 36, 38 to radially expand that end of the tube. Piston rod 114 of the lower cylinder 108 is of the same diameter as piston rod 110 and is inserted into the expanded end of a length of tubing T in a subsequent step in the operation of the apparatus, as described in more detail below.

OPERATION

Operation of the apparatus is best seen in FIGS. 7-12 which illustrate sequential steps in the forming of a tubular part TP of FIG. 13 from a straight length of tubing T of uniform diameter.

Figure 8:
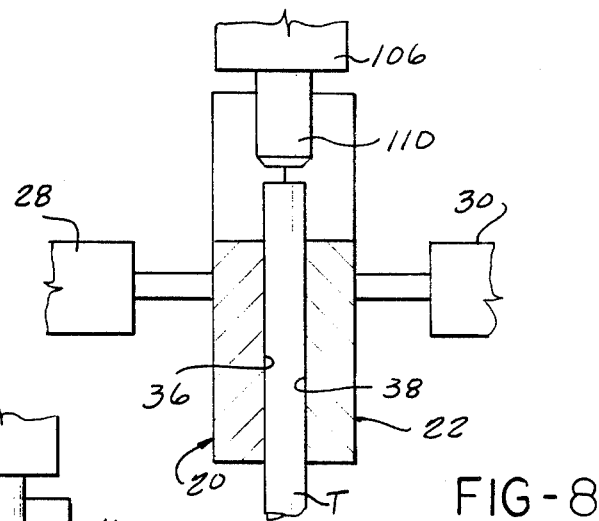
FIG. 8 is a view similar to FIG. 7 showing the die members at a subsequent stage in the operation of the device.
Figure 9:
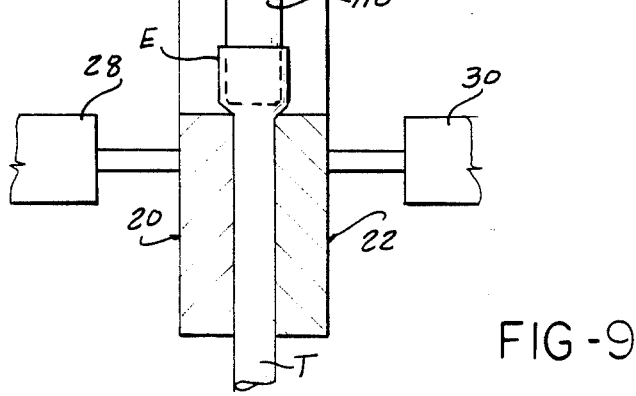
FIG. 9 is a view similar to FIG. 8 showing the device at a subsequent stage of operation.

FIGS. 7-9 illustrate the steps in the formation of the enlarged end section E and are performed with the length of tubing T clamped within recesses 36, 38 of the upper portion of the die.

In FIG. 7, the die members 20, 22 are shown in their open position with the expansion member 110 (piston rod of cylinder 106) in its fully retracted position. With the parts of the apparatus in the position shown in FIG. 7, the tube transfer device 88 is operated as described above to strip a length of tubing T from magazine 84 (FIG. 1) and to lower the magnetically held length of tubing into alignment with recesses 36, 38 of the open die members 20, 22.

Die members 20, 22 are then driven by cylinders 28, 30 to the closed position of FIG. 8, firmly clamping the length of tubing T between the two die members in recesses 36, 38 with the opposite ends of the tubing projecting from the opposite ends of the die member. The upper transfer device 88 is then returned to its start position.

With the length of tubing T so held, cylinder 106 is actuated to extend its piston rod 110 as shown in FIG. 9, driving piston rod 110 into the projecting end of tubing T to cold form an enlarged diameter end section E at one end of the length of tubing.

Lower transfer device 98 is then actuated to extend its piston rod 102 to position the magnetic cradle 100 in contact with the undeformed end of the length of tubing T clamped between the closed die members 20, 22, and to lower the length of tubing, after opening of the die members 20, 22 downwardly to position the freshly formed enlarged diameter end section E on the length of tubing, in alignment with recesses 44, 46 in the lower portions of the die members 20, 22.

The die members 20, 22 are then closed and plug member 114 (piston rod of cylinder 108) is driven by cylinder 108 into the enlarged diameter end section E and fully seated as shown in FIG. 11. Plug member 114 is so dimensioned as to be received with a tight force fit within end section E so that both the inside and outside surfaces of end section E are tightly engaged by the plug member and by the walls of the die recesses.

With the end section E so clamped, cylinder 70 of the bending apparatus is actuated to extend its position rod 68 to drive bending member 62 against the projecting portion of tube T to bend the tube against anvil portion 59 of die member 22, thereby forming bend B in the tube. During this bending operation, the tube T is engaged within groove 80 in bending member 62 and member 62 can pivot between the position shown in FIG. 11 and that shown in FIG. 12 to minimize friction between the tube and bending member during the bending operation. Bending member 62 is than retracted back to its original position. Plug member 14 is retracted from enlarged diameter end section E and the die members 20, 22 are opened to permit the completed part TP to drop freely from the apparatus.

Because the enlarged diameter end section E is rigidly gripped both internally and externally during the bending operation, the bend B may be formed closely adjacent to and in fact extending tangentially directly from enlarged diameter end section E without distortion of end section E.

While one embodiment of the invention has been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. Apparatus for forming, from a straight length of tubing of a uniform first diameter, a tubular part having a smoothly curved substantially ninety degree bend adjacent one end thereof merging tangentially into an enlarged diameter end section, said apparatus comprising a pair of opposed die members mounted for movement toward and away from each other between a die open and a die closed position, first means in said die members cooperable when said die members are in their die closed position for fixedly clamping a straight length of tubing between said die members with at least one end of said length of tubing projecting from said die members, first forming means axially insertable into the projecting end portion of said length of tubing clamped in said first means to expand said end portion to form said enlarged diameter end section at said one end of said length of tubing, second means in said die members cooperable when said die members are in their die closed position to fixedly clamp said enlarged diameter end section between said die members with the remaining portion of the length of tubing projecting coaxially from said die members, a tightly fitting plug member axially insertable into the enlarged diameter end section of said length of tubing clamped by said second means, and second forming means for bending the projecting portion of said length of tubing clamped by said second means into a substantially ninety degree bend tangentially merging with said end section.

2. The invention defined in claim 1 further comprising magazine means for storing a supply of lengths of tubing adjacent said die members, and transfer means operable when said die members are in their die open position for removing a length of tubing from said magazine means and positioning said length of tubing between said die members at a location operatively aligned with said first means to be engaged by said first means as said die members are moved to their closed position.

3. The invention defined in claim 1 wherein both opposite ends of a length of tubing clamped in said die members by said first means project from said die members, said apparatus further comprising tube transfer means engageable with the projecting portion of said length of tubing opposite said one end operable when said die members are in their die open position for transferring a length of tubing from operative alignment with said first means to a second position wherein said enlarged end portion is operatively aligned with said second means to be engaged thereby when said die members are moved to their die closed position.

4. Apparatus for forming, from a straight length of tubing of a uniform first diameter, a tubular part having a smoothly curved substantially ninety degree bend adjacent one end thereof merging tangentially into an enlarged diameter end section, said apparatus comprising a pair of opposed die members having opposed die faces lying in parallel vertical general planes mounted for horizontal movement toward and away from each other between a spaced die open position and a die closed position wherein said faces are engaged with each other, first recess means in said die faces cooperatively defining, when said die members are in their closed position, an open ended horizontal passage extending entirely across said die faces and conformed to clampingly receive a length of tubing with the ends of said tubing projecting from the opposite ends of said die member, forming means for expanding one projecting end of said length of tubing clamped in said first recess means to form said enlarged diameter end section, second recess means in said die faces cooperatively defining, when said die members are in their closed position an open ended horizontal passage extending entirely across said die faces and conformed to clampingly receive the enlarged diameter end section only of a length of tubing formed by said forming means with the remainder of said length of tubing projecting from one end of said die members, means defining a convexly curved anvil portion on one of said die members at said one end thereof extending tangentially from said second recess means and conformed to the radially inner side of said bend of said part, and bending means operable when said die members are in their closed position for bending that portion of said tubular part which projects from said one end of said die members into contact with said anvil portion.

5. The invention defined in claim 4 further comprising first transfer means engageable with the opposite end portions of a length of tubing operable when said die members are in their open position to locate the engaged length of tubing between said die faces in alignment with said first recess means, and second transfer means engageable with the other projecting end of a length of tubing clamped in said first recess and operable upon subsequent opening of said die members to carry the engaged length of tubing to a position between said die faces wherein the enlarged end section formed by said forming means is in alignment with said second recess means.

6. The invention defined in claim 5 wherein said transfer means comprises means for magnetically gripping said length of tubing.

7. The invention defined in claim 4 further comprising plug means insertable into tightly fitting relationship in the interior of an enlarged diameter end section clamped with said second recess means.

* * * * *